Oct. 13, 1942.  F. P. MASON  2,298,956
SPEED-INDICATING MEANS FOR USE IN PRINTING TELEGRAPH APPARATUS
Filed June 21, 1941  3 Sheets-Sheet 2

Patented Oct. 13, 1942

2,298,956

UNITED STATES PATENT OFFICE 2,298,956

SPEED-INDICATING MEANS FOR USE IN PRINTING-TELEGRAPH APPARATUS

Frederick Percival Mason, Croydon, England, assignor to Creed and Company Limited, Croydon, England Application June 21, 1941, Serial No. 399,092
In Great Britain August 16, 1940

9 Claims. (Cl. 178—69)

This invention relates to a system for testing the speed of printing telegraph apparatus, and is an improvement in or modification of the invention disclosed and claimed in British Patent No. 505,575.

According to one feature of the invention disclosed and claimed in British Patent No. 505,575, a system for testing the speed of printing telegraph apparatus comprises a transmitting source of signals at a constant speed located at a central station, means for enabling a station to be connected to the said source of signals over a communication channel for telegraph signals and means at the latter station to utilise the said signals to give an indication when the apparatus is rotating at correct speed, comprising a lamp, connecting means to connect said lamp to the said communication channel, and rotatable apparatus driven by the apparatus under test, adapted to be illuminated by said lamp and bearing marks spaced as to give an indication of correct speed when viewed.

Thus all of a number of stations may adjust the speed of their respective apparatus to be the same by reference in turn to the transmitting source at the central station.

The received signals are preferably applied to a neon lamp, a transformer being used to match the impedance of the lamp to that of the communication channel, and to cause the lamp to flash at each change of current in the channel.

The object of the present invention is to provide a means suitable for producing a short impulse at each transit of received telegraph signals. No moving contacts are employed, and no auxiliary power supply is necessary since energy is stored up throughout a signal period and then released at the next transit. The device is suitable for any wave-form of received signal between the extremes of rectangular and sinusoidal signals.

One feature of the inventior consists in an equipment for testing the speed of printing telegraph apparatus, as claimed in any of the claims of British Patent No. 505,575, characterised in that said lamp is illuminated by energy derived from said channel and stored until released upon receipt of a signal.

In order that the invention may be clearly understood, reference will be made to the accompanying drawings, in which.

Figure 1:
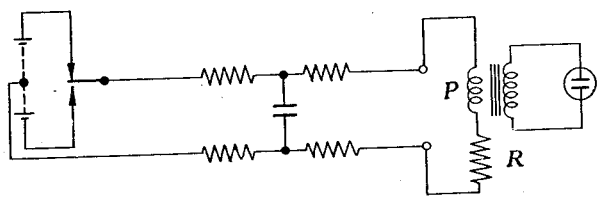
Fig. 1 shows a simple circuit somewhat similar to Fig. 3 of British patent specification No. 505,575.

The simple circuit shown in Fig. 1 can be used on very short lines since on such lines the transits are rapid, i. e., the rate of change of received voltage is rapid during the transit, although the rate of change of current depends on the inductance of the receiving impedance. In this case the receiving end of the line is connected to a resistance R and transformer primary winding P. When a reversal of transmitted current occurs, the current in P, and therefore the flux, reverses very rapidly, since the time constant of R and P can be made of the order of one millisecond. During the reversal of flux an E. M. F. is generated in the secondary windings S, and the neon lamp NL is energised during the transit.

Such a circuit is, however, of low efficiency since the energy available for flashing the lamp is limited to that of the transit only.

Transformers fall into two classes, viz., current transformers and potential transformers. In the former the current is determined mainly by the impedance of the source and in this case the secondary voltage is the differential coefficient of the current, while the energy is that of the transit only. In a potential transformer, the primary inductance is sufficiently high for the voltage wave-form applied to the primary to be reproduced across the secondary winding, in which case the current wave-form is not appreciably determined by the source. For instance, if square-topped telegraph signals (reversals) were transmitted over a short line, and a current transformer were used, the current also would be square-topped, and a pulse of E. M. F. would be generated in the secondary at each reversal. If, however, a potential transformer were used, a very small current would flow, consisting of a series of exponential transients. The value of the current is, therefore, continually changing and a secondary E. M. F. is generated at all times. The present invention utilises a potential transformer, and the applied voltage is nearly all dropped on the inductive impedance of the transformer, so that the energy dissipated in the primary resistance is negligible.

Figure 2:
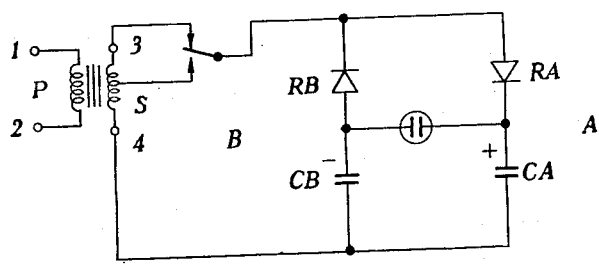
Fig. 2 shows a circuit for the better utilisation of the signal energy in operating the lamp.

Thus, while the line current is changing from one value to another, the transformer flux is changing and energy is being liberated at the secondary winding; but after the transit when the current adopts a constant value, no change of flux occurs and no energy is liberated, since all the signalling energy is then dissipated in the resistance R. In order to eliminate this waste it is necessary to provide storage means for this energy, and to cause the accumulated energy to be released and consumed rapidly at each transit. An arrangement operating in this manner is shown in Fig. 2.

This circuit comprises a step-up transformer, two rectifiers, two condensers and the neon lamp. The primary winding of the transformer is connected to the signalling line, the sending end of which is connected to a teleprinter sending the letter R continuously so that a signal approximating to reversals is received. In this description (for simplicity) it will be assumed that true reversals are sent. According to the length of the line the received signals will be of some shape between a square topped wave (on a short line) and a sine wave (on a long line). The transformer has a high ratio of inductance to resistance so that the time constant of the primary circuit is of the order of several signal periods. The received voltage wave is thus reproduced at the secondary terminals, the transformer ratio being such that the peak voltage is approximately 100 volts.

It may be pointed out that if a constant unidirectional potential is applied to a transformer having a high ratio of inductance to resistance, the current, as is well known, increases exponentially at a rate determined by the inductance and resistance. In the time constant $(L/R)$ is equal to several signal periods, the increase of current with time is very nearly linear during the first of these signal periods. Therefore, during this signal period, the flux also is changing linearly with time, and consequently a unidirectional E. M. F. is generated in the secondary winding. When the primary applied voltage is reversed in polarity, the whole action is reversed. If a continually increasing potential is applied to the primary, the rate of growth of the flux is continually increasing, giving a continually increasing secondary E. M. F. Thus, whatever potential wave form is applied to the primary will be reproduced at the secondary. It is then only necessary to provide the requisite number of turns in the secondary winding to produce the required voltage, in this case 100 volts.

Two circuits A and B are connected across the secondary winding S, each comprising a rectifier and a condenser. The rectifiers are connected so that an alternating E. M. F. in winding S will cause condenser CA to be charged so that its upper terminal is positive, while condenser CB is charged so that its upper terminal is negative. The arrangement is thus that of a simple Wheatstone bridge. SW is a switch connected to a tap on secondary winding S by which the voltage conditions of the circuit may be varied.

Considering the action at the commencement of a train of reversals after a prolonged marking condition, during which unidirectional current traverses winding P from terminal 1 to terminal 2, the flux has assumed a steady value, so that no E. M. F. is generated in winding S. Upon the arrival of the first dot in the train of reversals, which will be of sinusoidal formation, the current in winding P dies away and builds up in the opposite direction, flowing from terminal 2 to terminal 1. The flux reverses, and in doing so generates an E. M. F. in winding S so that terminal 3 is positive and terminal 4 is negative. This E. M. F. persists for one signal period, and from the beginning of this period until the peak voltage is reached, current flows through rectifier RA into condenser CA until the potential across CA is approximately 100 volts, the upper terminal being positive. During the remainder of the signal period no current flows since the charging voltage is less than the condenser voltage, but the condenser remains charged.

During the next signal period, terminal 3 becomes negative and terminal 4 positive, the value of the potential increasing and then decreasing. At some instant during the increase of potential the sum of the potentials across winding S and CA will exceed 180 volts. Since these two potentials are in series with the neon lamp, via rectifier RB ionisation will occur and CA will discharge, through the neon lamp, the rectifier RB, and the winding S, to such a potential that the sum of this potential and that across winding S is too low to maintain ionisation. The potential across winding S continues to increase, but not sufficiently to cause further ionisation of the neon lamp. The inductance of winding S tends to maintain the discharge current, and results in a more complete discharge of CA and a consequent brighter flash from the neon lamp.

While the above action takes place CB has been charged to about 100 volts (the upper terminal being negative), by reason of the potential across winding S and the action of RB. At the end of this signal period CA is left charged to about 60 volts.

During the next signal period a similar process occurs. Terminal 3 of winding S becomes positive and eventually reaches a potential such that when combined via rectifier RA with the 100 volts across CB the potential across the neon lamp is sufficient to ionise it, and CB is left charged to about 60 volts. Meanwhile CA is recharged via RA to 100 volts. Thereafter, every signal period gives rise to a flash on the neon lamp, the duration of the flash being determined by the capacity of the condensers CA and CB and not by the wave shape of the incoming signal.

Figure 3:
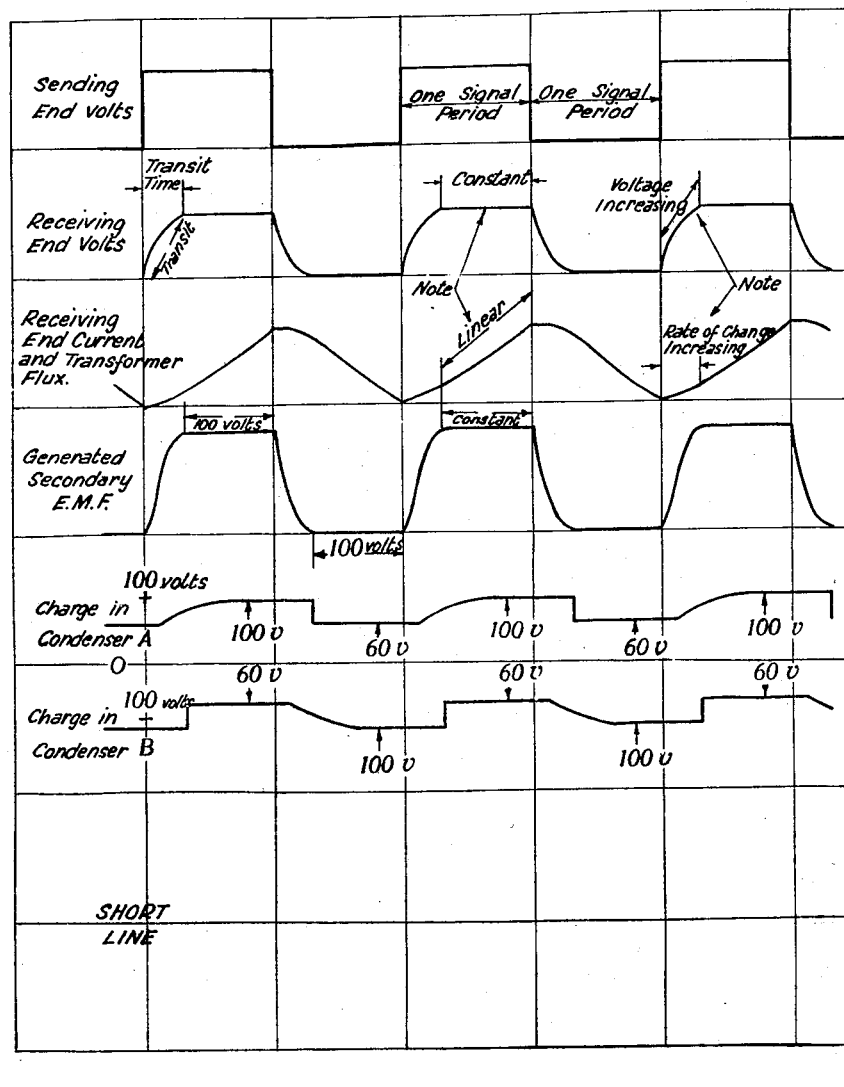
Fig. 3 and Fig. 3A when placed side to side are an illustrative chart.
Figure 3A:
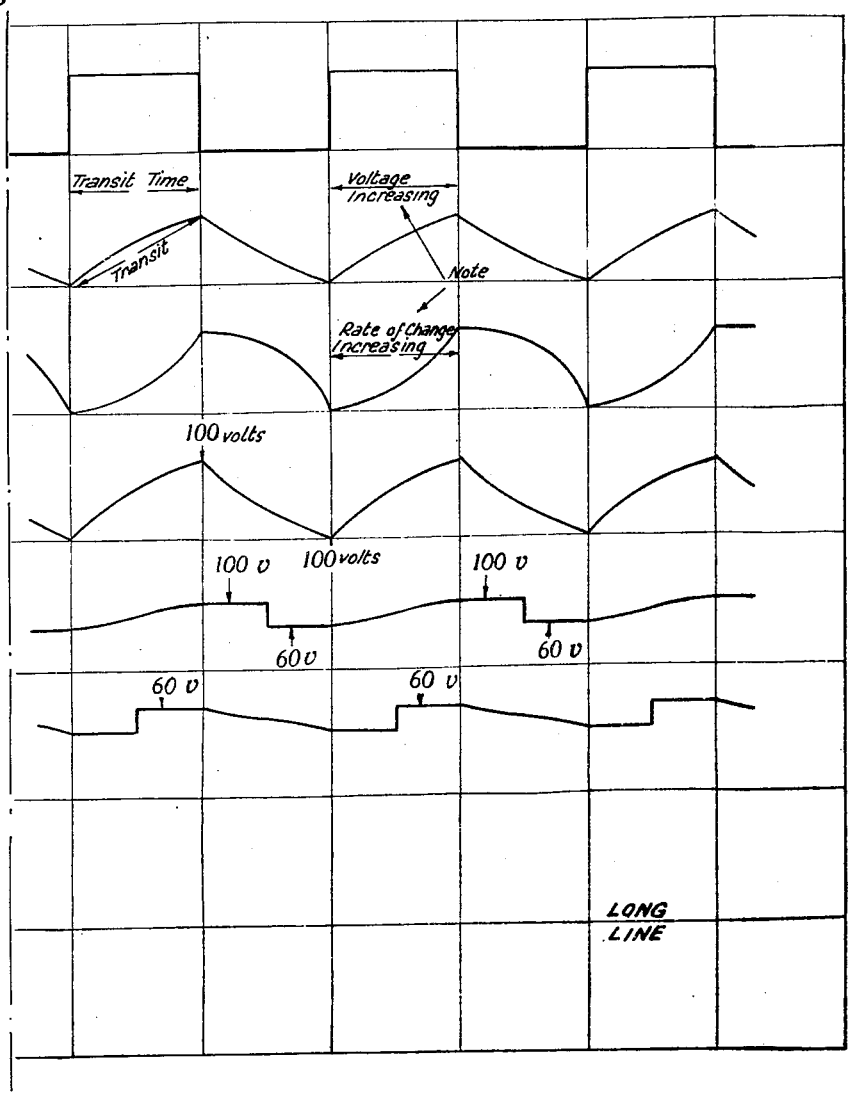

In further explanation reference may be made to the charts shown in Fig. 3.

During a signal element of one kind, one condenser is being charged, and, at some instant during the signal period the neon lamp flashes. The condenser being charged has at this instant a charge of about 80 volts, which together with the charge on the other condenser (about 100 volts), strikes the lamp. Now the voltage at which the lamp extinguishes itself is about 40 volts less than the striking voltage. Therefore, since the first condenser is still being charged and maintains its voltage, the second condenser must drop in voltage by 40 volts before the lamp is extinguished. Since the second condenser was previously charged to 100 volts it will, therefore, discharge until it is charged to only 60 volts, at which voltage it remains until the next signal element arrives (which is of opposite polarity). Meanwhile, during the remainder of the present dot period, the first condenser completes its charge to 100 volts. Now during the next dot period the second condenser charges to 100 volts, while, when the lamp flashes, the first condenser discharges to 60 volts. To sum up, the 100 volts value is the voltage to which the condensers are charged, while the 60 volts value is the voltage to which each condenser is discharged. The action is symmetrical and there is no difference between the voltages concerned in the positive and negative signals.

What is claimed is:

1. A system for testing the speed of printing telegraph apparatus comprising a source of signals at constant speed located at a first station, a lamp at said receiving station, means for transmitting said signals over a communication channel to a second station and means at the second station to utilise the said signals to give an indication when the said printing telegraph apparatus is rotating at correct speed, comprising a Wheatstone bridge circuit of which two adjacent arms comprise condensers, and the other two comprise rectifiers, connected to said communication channel at the ends of one diagonal, a lamp connected in the other diagonal of said bridge and rotatable apparatus driven by said printing telegraph apparatus adapted to be illuminated by said lamp and bearing marks spaced to give an indication of correct speed when viewed.

2. A system for testing the speed of printing telegraph apparatus comprising a source of signals at constant speed located at a first station, a lamp containing neon at said receiving station, means for transmitting said signals over a communication channel to a second station and means at the second station to utilise the said signals to give an indication when the said printing telegraph apparatus is rotating at correct speed, comprising a Wheatstone bridge circuit of which two adjacent arms comprise condensers, and the other two comprise rectifiers, connected to said communication channel at the ends of one diagonal, a lamp containing neon connected in the other diagonal of said bridge, and rotatable apparatus driven by said printing telegraph apparatus adapted to be illuminated by said lamp and bearing marks spaced to give an indication of correct speed when viewed.

3. A stroboscope circuit adapted to aid in adjusting the speed of telegraph equipment comprising a telegraph line, a transformer having a primary circuit energized by signals received from said line, said transformer having characteristics such that an electromotive force is generated across the secondary winding thereof at all times during the reception of signals, a circuit connected across the output terminals of the secondary winding of said transformer including a pair of condensers and a neon lamp, means in said circuit effective with changing potentials in said secondary winding for discharging said condensers alternately through said neon lamp.

4. A stroboscope circuit according to claim 3 in which said condensers are only partially discharged.

5. A stroboscope circuit according to claim 3 wherein said means comprise a pair of oppositely connected rectifiers.

6. A stroboscope circuit according to claim 3 wherein said means comprise a pair of rectifiers, said rectifiers being oppositely connected to one terminal of the secondary winding of said transformer, and wherein said neon lamp is connected between the other terminals of said rectifiers, and each terminal of said neon lamp being also connected through an individual condenser to the other terminal of the secondary winding of said transformer.

7. A stroboscope circuit adapted to aid in adjusting the speed of telegraph equipment comprising a telegraph line, a potential transformer of step-up ratio having a primary inductance sufficiently high for the wave form of telegraph signals to be reproduced across the secondary winding thereof whereby a secondary electromotive force is generated at substantially all times during signalling, means for energizing the primary of said transformer under control of line signals, a Wheatstone bridge having a pair of condensers in adjacent arms and a pair of oppositely connected rectifiers in the opposite arms, circuits connecting the respective apexes of said bridge to the respective secondary terminals of said transformer and a neon lamp connected across said bridge arranged to ionize periodically due to the effect of rising current in the secondary winding of said transformer and a discharge from one of said condensers.

8. A circuit according to claim 7 wherein the ionizing voltage of said neon lamp is greater than the peak voltage of said transformer.

9. A circuit according to claim 7 wherein the condensers remain charged during each cycle with a voltage just under the extinguishing voltage of the neon lamp.

FREDERICK PERCIVAL MASON.